E. E. EVERSON.
LOADING MACHINE.
APPLICATION FILED MAR. 8, 1917.

1,249,054.

Patented Dec. 4, 1917.

Inventor:
Ervin E. Everson.
by
Attorney.

UNITED STATES PATENT OFFICE.

ERVIN E. EVERSON, OF LYLE, MINNESOTA, ASSIGNOR OF ONE-FOURTH TO ELMER J. JACOBS, ONE-FOURTH TO WILLIAM J. ABERLE, AND ONE-FOURTH TO EDWARD M. ABERLE, ALL OF ST. PAUL, MINNESOTA.

LOADING-MACHINE.

1,249,054.  Specification of Letters Patent.  Patented Dec. 4, 1917.

Application filed March 8, 1917. Serial No. 153,286.

*To all whom it may concern:*

Be it known that I, ERVIN E. EVERSON, a citizen of the United States, residing at Lyle, in the county of Moore and State of Minnesota, have invented a new and useful Improvement in Loading-Machines, of which the following is a specification.

This invention relates to improvements in loading machines, and is particularly although not exclusively adapted for loading manure into wagons. The primary object of this invention is to provide a machine which will load material into vehicles with a minimum amount of hand labor and expense.

Among further objects is adjustability of the parts to perform the loading function.

With these and other objects in view, my invention comprises the features of construction and combination of parts which are hereinafter particularly described.

Figure 1:
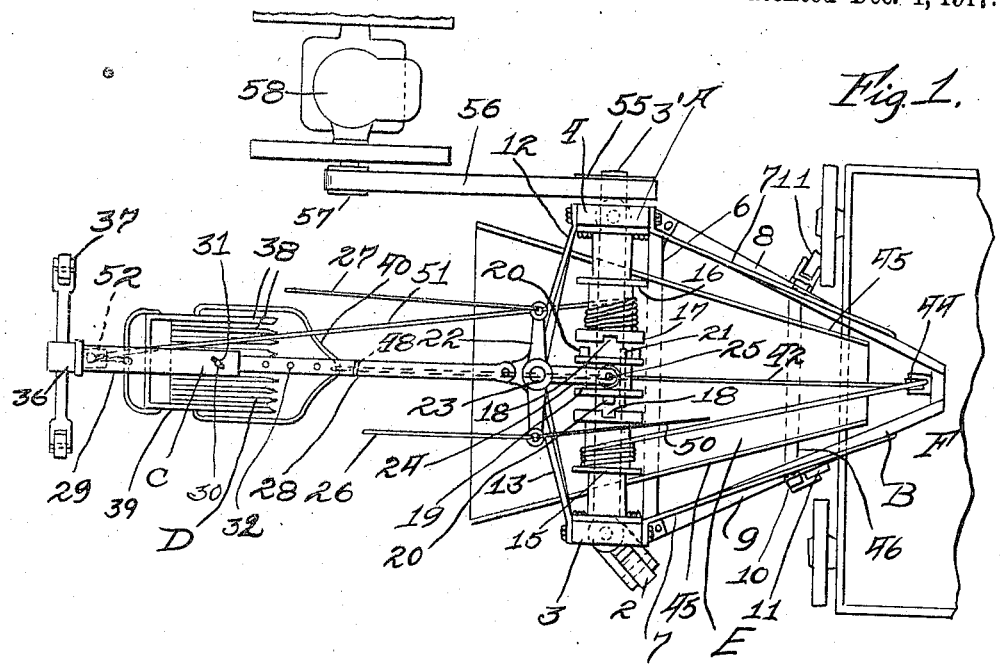
Figure 2:
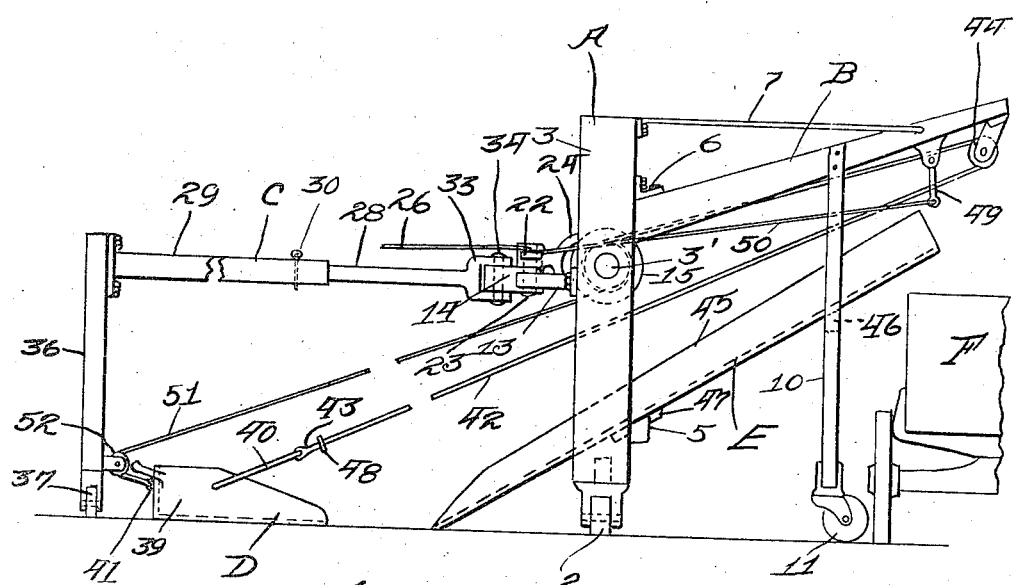

In the accompanying drawing forming part of this specification, Figure 1 is a plan of my invention, and Fig. 2 is a side elevation.

In the drawing let A indicate a main frame having caster wheels 2 swiveled upon its lower end to assist in transferring the frame from place to place. This frame has a pair of vertical supports 3 and 4, which are cross-braced by means of the bars 5 and 6 together with an overhanging forwardly extending yoke B, which is secured to the bar 6. The overhanging yoke B is also supported by means of the tension rods 7, which are fastened to the sides 8 and 9 of the yoke and to the vertical posts 3 and 4. The yoke is also supported upon the ground by means of the supporting member 10, which also has caster wheels 11 swiveled in its lower end for assisting in transferring the device from place to place. The vertical supports 3 and 4 are also braced by means of the arms 12 and 13, which carry midway between the vertical posts 3 and 4, a clevis support 14 extending backwardly from the frame.

Journaled freely upon the shaft 3' are two cable winding and unwinding drums 15 and 16 having inwardly facing ends 17 formed with grooves 18 to provide driven clutch members with which a driving clutch member 19 having clutch engagements 20, is adapted to engage, the neutral position of the driving clutch member being out of connection between both driven clutch members. The driving clutch member is secured on the shaft 3' by means of the feather 21. The driving clutch member 19 is moved into engagement with either of the clutch members by means of the shift 22, which is in the form of a lever arm pivoted midway between its ends by means of the pin 23 upon the clevis member 14, said lever arm being formed with a yoke 24 spanning a portion and secured to the clutch driving member 19 by means of the trunnion pins 25. Connected to the two opposite ends of the shift lever 22 are flexible pulling lines 26 and 27 extending rearwardly, so that an operator by pulling upon either of the lines while standing at the rear of the machine can throw the clutch driving member into or out of connection with either of the drums 15 and 16 to effect their revolution.

Extending rearwardly from the frame A is an extensible reach arm member C in the form of two longitudinal sections 28 and 29, the member 28 being telescopically secured in the member 29 in adjusted extensible position by means of the pin 30 passing through the opening 31 in the member 29 and any of the openings 32 in the member 28. The forward end of member 28 is pivotally secured to the clevis member 14 by means of the yoke 33 and king pin 34, so that the extensible reach member may be freely swung laterally. The rearward extremity of member 29 is supported upon a carrier frame 36, the lower end of said carrier frame being provided with caster wheels 37 so that the reach member may easily be swung about its pivot 34 into any lateral position desired.

Disposed between the carrier member 36 and the forward end of the entire structure to move forwardly and backwardly is a fork member D having a series of longitudinal prongs 38 forming the floor of a bucket member 39. To the sides of the bucket member is secured a bail 40 and to the rearward end of the bucket member is secured an eye piece 41. To pull the bucket member forwardly and cause it to dig up and carry a load of material, such as manure, a loading cable 42 is secured to the bail by means of the link 43 and to the loading drum 15, said cable being passed around a sheave 44, which is hung from the forward extremity of the overhanging reach member B, so that as the drum 15 winds the cable 42, the bucket is caused to carry its load forwardly.

Disposed in the forward path of the bucket D is an upwardly inclined conveyer E in the form of a trough, the sides 45 of which converge from widely disposed position at the lower end thereof toward its upper end, so that the bucket irrespective of its position will be guided upwardly when it is drawn forward. The conveyer E is supported in upwardly inclined position as stated upon the cross pieces 5 and 46 respectively mounted upon the members 3 and 4 and the support 10 and a stop piece 47 on the floor of the conveyer assists in preventing the conveyer from sliding down out of position. The conveyer at any time can be removed from the apparatus when it is desired to do so. When the bucket D reaches the elevated end of the conveyer, it tips downwardly and is adapted in tipping position to deposit its load in a receptacle such as the wagon box of the truck F. Immediately upon the fork member D reaching the upper end of the conveyer E, a stop 48 formed on the link 43 strikes an arm 49, which is swung from the overhanging yoke B, swinging the lower end of the arm 49 forwardly. The lower end of the arm 49 is connected to one end of the shifting member 22 by means of the trip rod 50, whereby the shift member 22 is adapted to disengage the driving clutch member 19 from the driven member 17, and cause the loading drum 15 to cease winding the cable 42 automatically when the fork member D reaches fully dumping position at the upper end of the conveyer E. The rearward end of the fork member D has secured to its eye 41 a return cable 51, which is attached to the return drum 16 and passes over a sheave pulley 52, which is mounted upon the reach support 36 in position so that as the loading fork travels forwardly the return cable 51 unwinds from the return drum 16, but when the driving clutch member 19 is engaged from the driven member 17 by pulling upon the cable 27, the drum 16 is caused to wind the cable 51 and pull or return the fork member D into fully return position.

*Operation.*

In operation and assuming the fork member D to be in load engaging position as illustrated in Fig. 2, the cable 26 is pulled, resulting in the drum 15 winding the cable 42. This causes the fork member to be drawn forwardly engaging its load and carrying it up the inclined conveyer E until it tips and deposits the load into the wagon box, whereupon the clutch is disengaged and the drum 15 ceases to wind the loading cable. To return the loading fork, the cable 27 is pulled and the drum 16 thereupon winds the return cable 51, thus drawing the fork member backwardly into load engaging position. The reach member C can be swung about its pivot into any suitable position, so that the fork member can be adjusted over a wide range or field of operation without moving the entire structure, but when it is desired to move the entire structure it can be easily shifted upon its carrier wheels from place to place and made to assume a new position. It is not necessary to provide the parts of the structure as described with carrier wheels as shown, it being obvious that any suitable skid means may be employed for that purpose. As illustrated, the driving shaft 3' is driven by a driving pulley 5, belt 56 and pulley 57, which in turn is driven by an internal combustion engine 58 or any other suitable source of power or driving mechanism described.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A loading machine, comprising, in combination, a main frame having an overhanging support extending therefrom, a slide supported in upwardly inclined position on said frame and arranged at its upper forward end to deposit material into a receptacle, a reach member swiveled to swing in an arc from said frame and extending rearwardly from the lower end of said slide, winding and unwinding drums journaled upon said frame, driving means journaled upon said frame, a clutch interposed between said drums to shift and engage either one and driven by said driving means, line controlled means for shifting said clutch from the rear of said machine, a forward sheave mounted upon the outer extremity of said overhanging support, a rearward sheave mounted upon the rearward extremity of said reach member, a fork, a return cable attached to the rearward portion of said fork passing around said rearward sheave and secured to one of said drums, a loading cable secured to said fork passing around said forward sheave and secured to the other of said drums, and means controlled by the operation of said fork to disengage said clutch and cause said winding drum to cease revolution when the fork assumes dumping position over the upper edge of said slide.

2. A loading machine, comprising, in combination, a main frame having an overhanging support extending therefrom, a slide supported in upwardly inclined position on said frame and arranged at its upper forward end to deposit material into a receptacle, an extensible reach member swiveled to swing in an arc from said frame, extending rearwardly from the lower end of said slide and having skid means below its free extremity, winding and unwinding drums journaled upon said frame, driving means journaled upon said frame, a clutch interposed between said drums to shift and engage either one and driven by said driving means, line controlled means for shifting said clutch from the rear of said machine, a forward sheave mounted upon the outer extremity of said overhanging support, a rearward sheave mounted upon the rearward extremity of said reach member, a fork, a return cable attached to the rearward portion of said fork passing around said rearward sheave and secured to one of said drums, a loading cable secured to said fork passing around said forward sheave and secured to the other of said drums, and means controlled by the operation of said fork to disengage said clutch and cause said winding drum to cease revolution when the fork assumes dumping position over the upper edge of said slide.

3. A loading machine, comprising in combination, a main frame having an overhanging support extending therefrom, a slide removably supported in upwardly inclined position on said frame and arranged at its upper forward end to deposit material into a receptacle, said slide having sides converging from its lower to its upper end, an extensible reach member swiveled to swing in an arc from said frame, extending rearwardly from the lower end of said slide and having skid means below its free extremity, winding and unwinding drums journaled upon said frame, driving means journaled upon said frame, a clutch interposed between said drums to shift and engage either one and driven by said driving means, line controlled means for shifting said clutch from the rear of said machine, a forward sheave mounted upon the outer extremity of said overhanging support, a rearward sheave mounted upon the rearward extremity of said reach member, a fork, a return cable attached to the rearward portion of said fork passing around said rearward sheave and secured to one of said drums, a loading cable secured to said fork passing around said forward sheave and secured to the other of said drums, and means controlled by the operation of said fork to disengage said clutch and cause said winding drum to cease revolution when the fork assumes dumping position over the upper edge of said slide.

In testimony whereof, I have hereunto signed my name to this specification.

ERVIN E. EVERSON.

Copies of this patent may be obtained for five cents each, by addressing the "Commissioner of Patents, Washington, D. C."